United States Patent
Yoon et al.

(10) Patent No.: US 11,448,813 B1
(45) Date of Patent: Sep. 20, 2022

(54) DIFFUSER FOR ILLUMINATING PORT

(71) Applicant: Waymo LLC, Mountain View, CA (US)

(72) Inventors: Joongmin Yoon, Mountain View, CA (US); Scott Duncan, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 46 days.

(21) Appl. No.: 16/908,112

(22) Filed: Jun. 22, 2020

(51) Int. Cl.
F21V 8/00 (2006.01)
F21V 3/00 (2015.01)
F21W 111/00 (2006.01)
F21Y 115/10 (2016.01)

(52) U.S. Cl.
CPC .............. G02B 6/0051 (2013.01); F21V 3/00 (2013.01); F21W 2111/00 (2013.01); F21Y 2115/10 (2016.08)

(58) Field of Classification Search
CPC ..................... H01R 13/7175; H01R 13/7172
See application file for complete search history.

(56) References Cited

U.S. PATENT DOCUMENTS

| | | | |
|---|---|---|---|
| 5,915,993 A * | 6/1999 | Belopolsky | H01R 13/717 439/490 |
| 6,428,174 B1 | 8/2002 | Snider | |
| 7,750,886 B2 | 7/2010 | Sampsell | |
| 7,824,747 B2 | 11/2010 | Hay et al. | |
| 7,903,194 B2 | 3/2011 | Epstein et al. | |
| 8,922,733 B2 | 12/2014 | Wheatley et al. | |
| 9,880,341 B2 | 1/2018 | Peterson et al. | |
| 9,894,257 B2 | 2/2018 | Fournier et al. | |
| 10,334,184 B2 | 6/2019 | Wang et al. | |
| 10,475,358 B2 | 11/2019 | Peterson et al. | |
| 2005/0185389 A1 * | 8/2005 | Henriet | G02B 6/0061 362/23.15 |
| 2008/0166006 A1 | 7/2008 | Hankey et al. | |
| 2014/0170903 A1 * | 6/2014 | Tuchrelo | H01R 13/665 439/620.21 |
| 2017/0220840 A1 * | 8/2017 | Wickboldt | H01L 27/3234 |
| 2019/0103699 A1 * | 4/2019 | Yamanaka | H01R 13/6581 |
| 2019/0121016 A1 | 4/2019 | Kim et al. | |

FOREIGN PATENT DOCUMENTS

| | | |
|---|---|---|
| JP | 2014048067 A | 3/2014 |
| WO | 2017210221 A1 | 12/2017 |

OTHER PUBLICATIONS

Nicolas Sunderland, "Shaping LED diffuser performance with polycarbonate materials", Covestro LLC, 2017.

* cited by examiner

Primary Examiner — Eric T Eide
(74) Attorney, Agent, or Firm — McDonnell Boehnen Hulbert & Berghoff LLP

(57) ABSTRACT

A display console comprises a housing comprising a front panel, a light source disposed within the housing, a port positioned within an aperture of the front panel, and a diffuser. The diffuser comprises a first portion proximate the port and a second portion proximate the light source such that the diffuser diffuses light from the light source out the aperture of the front panel, wherein the second portion includes a flange.

16 Claims, 8 Drawing Sheets

DIFFUSER FOR ILLUMINATING PORT

BACKGROUND

Electronic consoles, such as display consoles, often include ports to which external devices can be connected. Connecting to the port enables the external device to transmit data to or receive data from the electronic console. The port may also provide power so as to charge the external device.

In some examples, the port is illuminated to increase visibility to a potential user. The perimeter of the port is illuminated so as to indicate the shape and size of the port, enabling users to easily identify the type of port. In an example, the port is directly illuminated by one or more designated lights, such as LEDs. However, direct lighting may cause inconsistent intensity along the perimeter. Direct lighting also requires positioning the light proximate the port where space is limited.

SUMMARY

In some examples, a console includes a housing, a light source disposed within the housing, a port, and a diffuser. The port is located within an aperture in the housing such that the port is accessible from the exterior of the console. The diffuser includes a first portion proximate the port so as to be visible through the aperture. The diffuser includes a second portion distal from the first portion and proximate the light source.

In one example, the second portion of the diffuser includes a flange extending outward therefrom proximate the light source. In operation, light from the light source enters the second portion of the diffuser. The light is diffused through the diffuser and exits the first portion so as to illuminate the port.

In another example, the console includes a display screen. The diffuser includes an opaque coating on at least one surface thereof. The at least one surface at least partially faces the display screen such that the opaque coating is between the diffuser and the display screen. In one form, the opaque coating includes a first, interior layer and a second, exterior layer. The interior layer is a bright color, such as white or light gray, so as to reflect visible light back into the diffuser. The exterior layer is a dark color, such as black or dark gray, so as to absorb visible light.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

An electronic console, such as those found in vehicles, includes an electronic interface to interact with a user. An example console includes at least one charging port having an illuminated indicator. The console includes other illuminated indicia, such as a second charging port or a logo.

Figure 1:
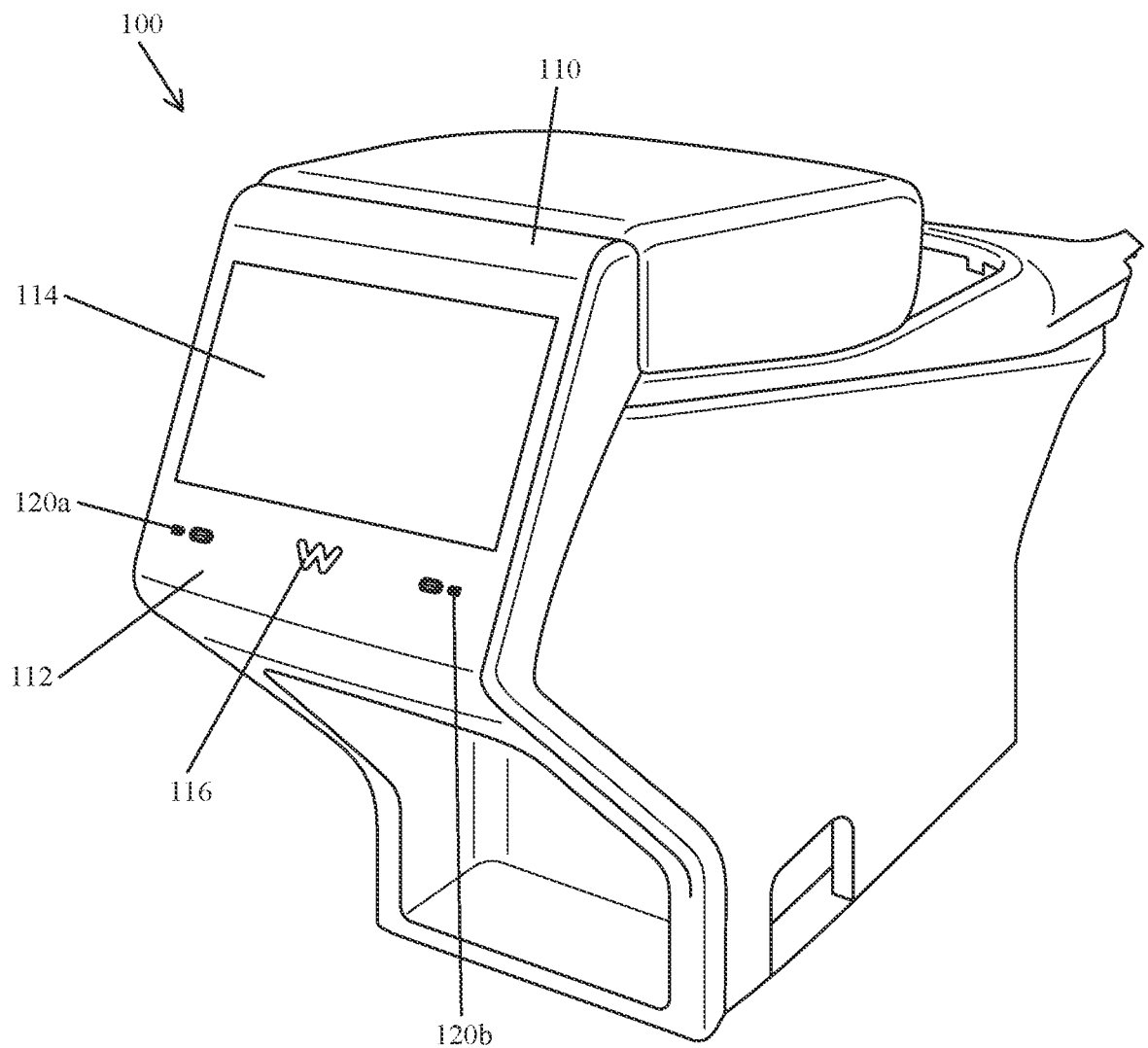
FIG. 1 is a perspective view of an electronic console according to example embodiments.
Figure 4:
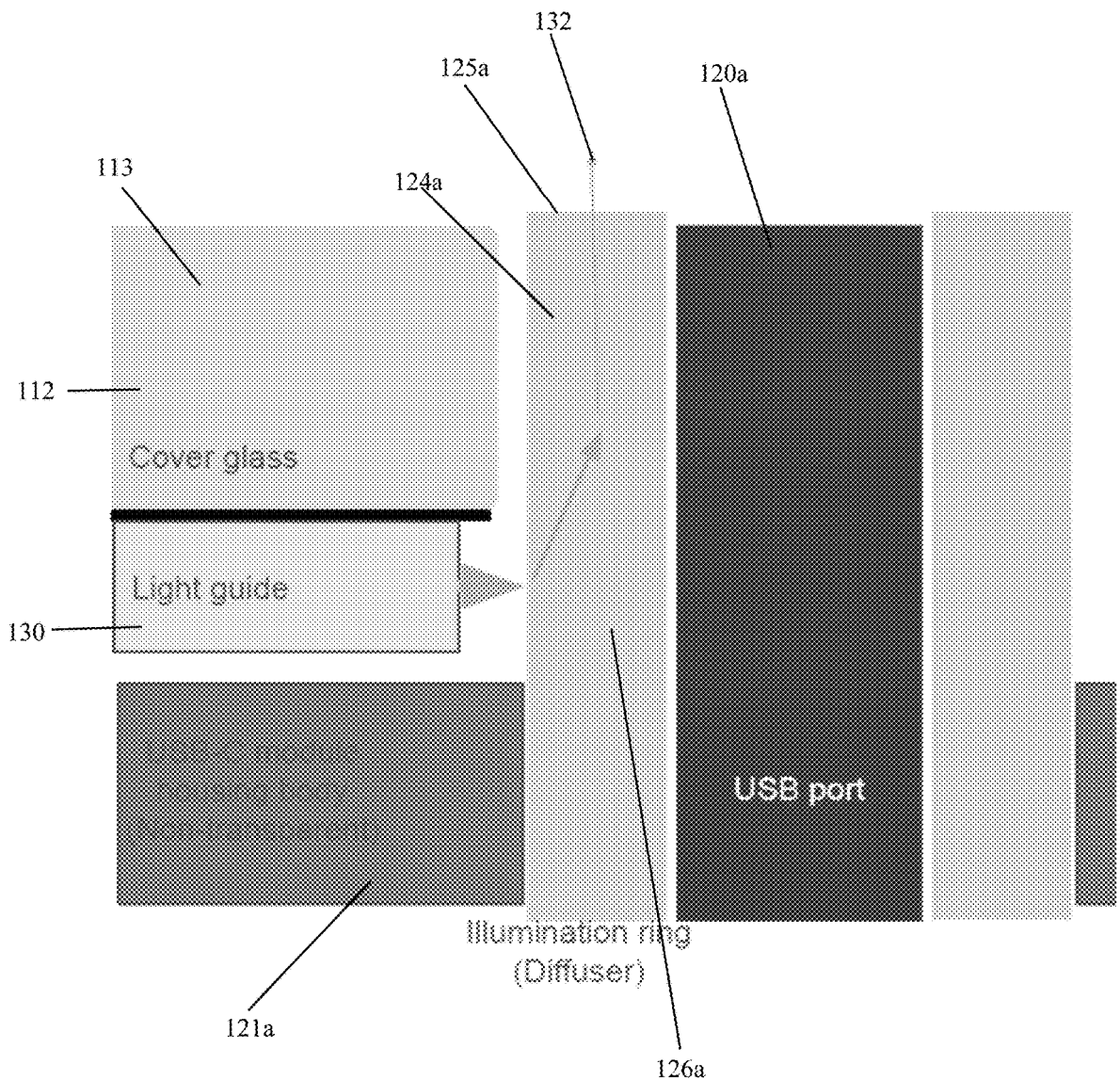
FIG. 4 is a simplified block diagram illustrating a port and diffuser according to example embodiments.

Referring now to the figures, FIG. 1 is a perspective view of a console 100 for use in a vehicle, according to an example embodiment. As shown, the console 100 includes a housing 110 having a front panel 112. The front panel 112 has a display 114 for displaying information to passengers. The console 100 includes illuminated ports 120a, 120b. The console 100 further includes an illuminated logo 116. The illuminated ports 120a, 120b and logo 116 are located in the front panel proximate the display 114. The front panel 112 includes a transparent panel, or cover glass 113 as shown in FIG. 4. The cover glass 113 covers a significant portion of the front surface of the front panel, including the logo 116. It is understood that the cover glass 113 can be formed of transparent materials other than glass, such as plastic.

The display 114 serves as a user interface for facilitating interaction with passengers. In one embodiment, the display 114 is a touchscreen through which the passengers can interact with the vehicle. For example, the display 114 displays data and receives inputs relating to climate control, music or other entertainment, navigation, and/or lighting. In other embodiments, the console 100 includes other inputs, such as buttons or dials, for receiving control information from the passengers.

Figure 2:
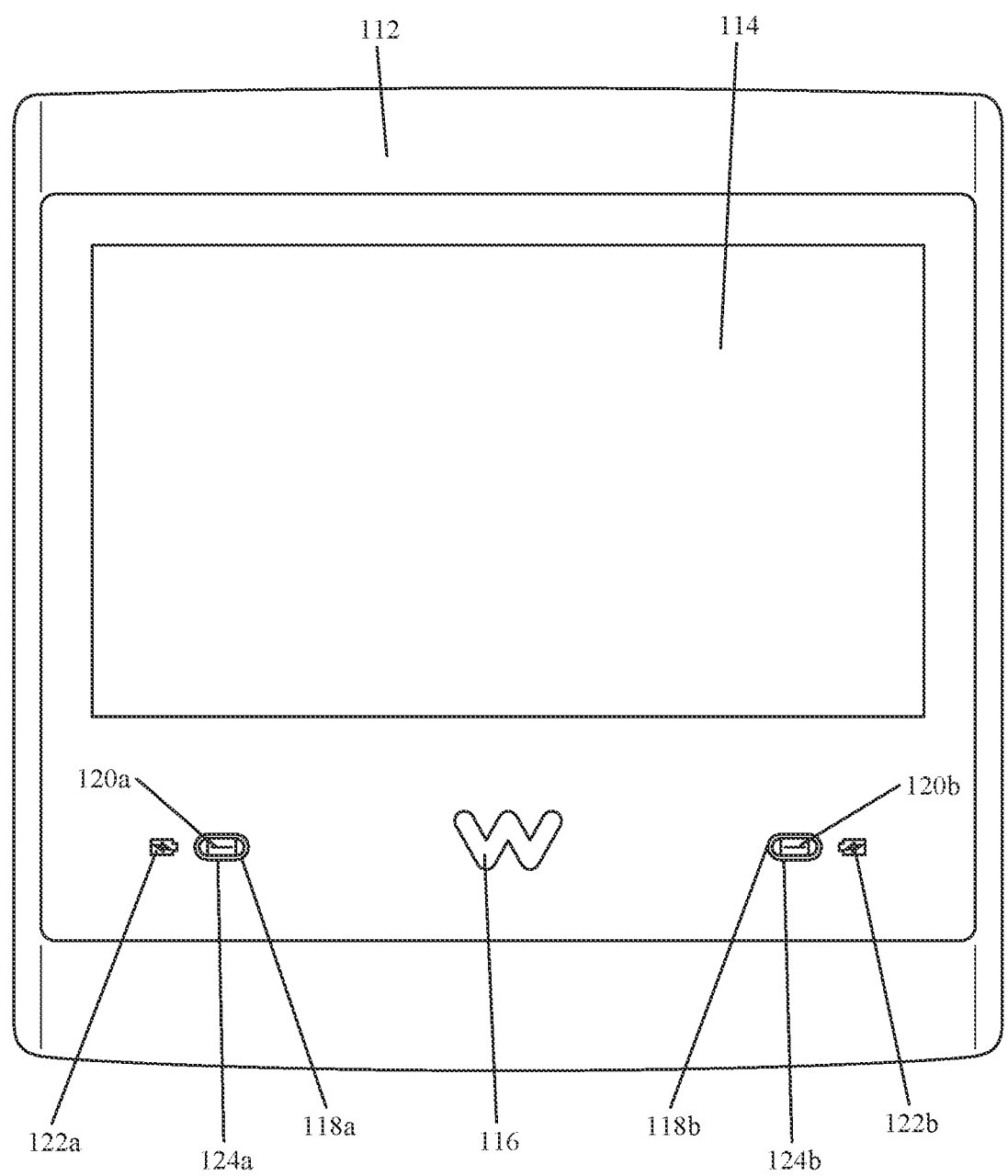
FIG. 2 is a front view of the front panel of the electronic console of FIG. 1.

Turning to FIG. 2, the front panel 112 includes apertures 118a, 118b corresponding to respective ports 120a, 120b. The ports 120a, 120b are accessible through the apertures enabling a plug to be connected thereto. Ring shaped diffusers 124a, 124b extend around the perimeter of the ports 120a, 120b and are visible through the apertures 118a, 118b. The diffusers 124a, 124b output light diffused therethrough in order to illuminate the ports 120a, 120b. The shape of the diffusers 124a, 124b serve as indicia to indicate to the user, such as passengers in the vehicle, the type of port 120a, 120b.

In some forms, the front panel 112 includes additional indicia 122a, 122b indicating the type or intended use of the ports 120a, 120b. In the shown example, the indicia 122a, 122b are charging symbols. In alternative embodiments, the indicia are port specific symbols, such as USB symbols.

Figure 3:
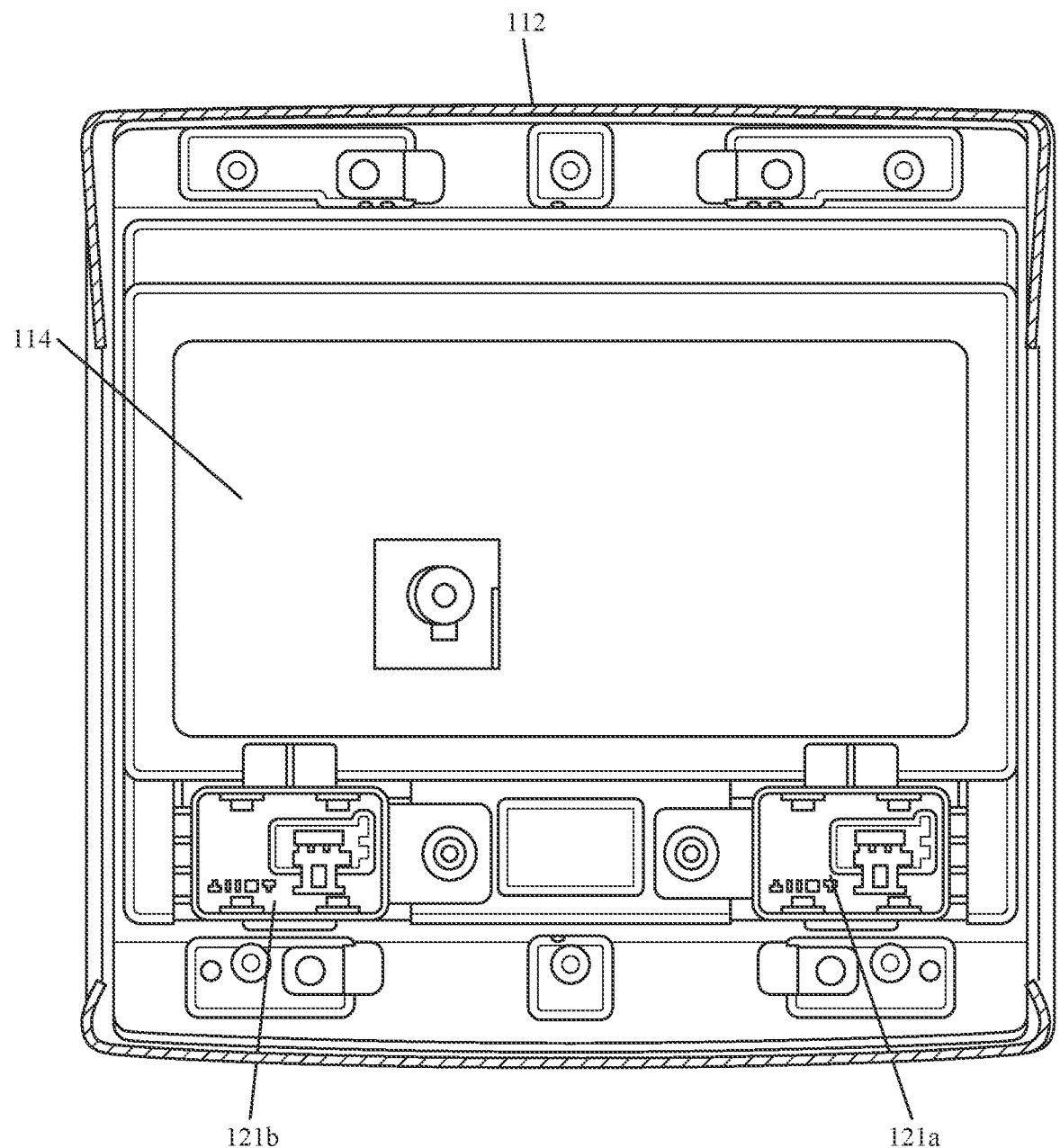
FIG. 3 is a rear view of the front panel of FIG. 2.

The shown ports 120*a*, 120*b* are Universal Serial Ports ("USB"), such as Universal Serial Ports Type-C ("USB-C") ports. It is understood that the console 100 may include other types of charging and/or data transfer ports in place of or in addition to the USB-C ports 120*a*, 120*b*. The ports 120*a*, 120*b* are part of input/output modules 121*a*, 121*b* located within the housing 110 (as shown in FIG. 3).

In some embodiments, as shown in FIG. 4, the diffuser 124*a* has an annular shape extending into the housing 110 along the length of the port 120*a*. The diffuser 124*a* includes a first portion 125*a* visible through the aperture 118*a* in the front panel 112. The diffuser 124*a* further includes a second portion 126*a* distal the first portion 125*a* and located within the housing 110.

As shown, a light source 130 is positioned within the housing 110 proximate the second portion 126*a* of the diffuser 124*a*. In some forms, the light source 130 includes a light guide which directs light within the housing 110. The use of a light guide enables a single light source 130 to be used to illuminate multiple indicia on the console 100, such as the diffusers 124*a*, 124*b*, port indicia 122*a*, 122*b*, and logo 116. The light guide directs light from the light source to the cover glass 113 at the indicia. The light source 130 can be adjusted for color and/or intensity, thus uniformly affecting each indicia.

Light 132 transmitted by the light source 130 enters the second portion 126*a* of the diffuser 124*a*. As shown, the light 132 passes through the diffuser 124*a* from the second portion 126*a* to the first portion 125*a* and then is transmitted out of the first portion 125*a* so as to illuminate the port 120*a*.

The light source 130 is spaced apart from the diffuser 124*a*. Spacing the light source 130 causes the light source 130 to illuminate a larger surface area of the diffuser 124*a*, thus increasing the brightness and uniformity of the light 132 exiting the first portion 125*a* of the diffuser 124*a*. As shown, the light source 130 is located to the side of the diffuser 124*a*, as opposed to behind the diffuser 124*a* (directly inward from the aperture 118*a*). Positioning the light source 130 to the side increases the uniformity of the light 132 exiting the first portion 125*a*. This positioning further enables the use of a longer diffuser 124*a* that extends substantially the entire length of the port 120*a*.

Figure 5:
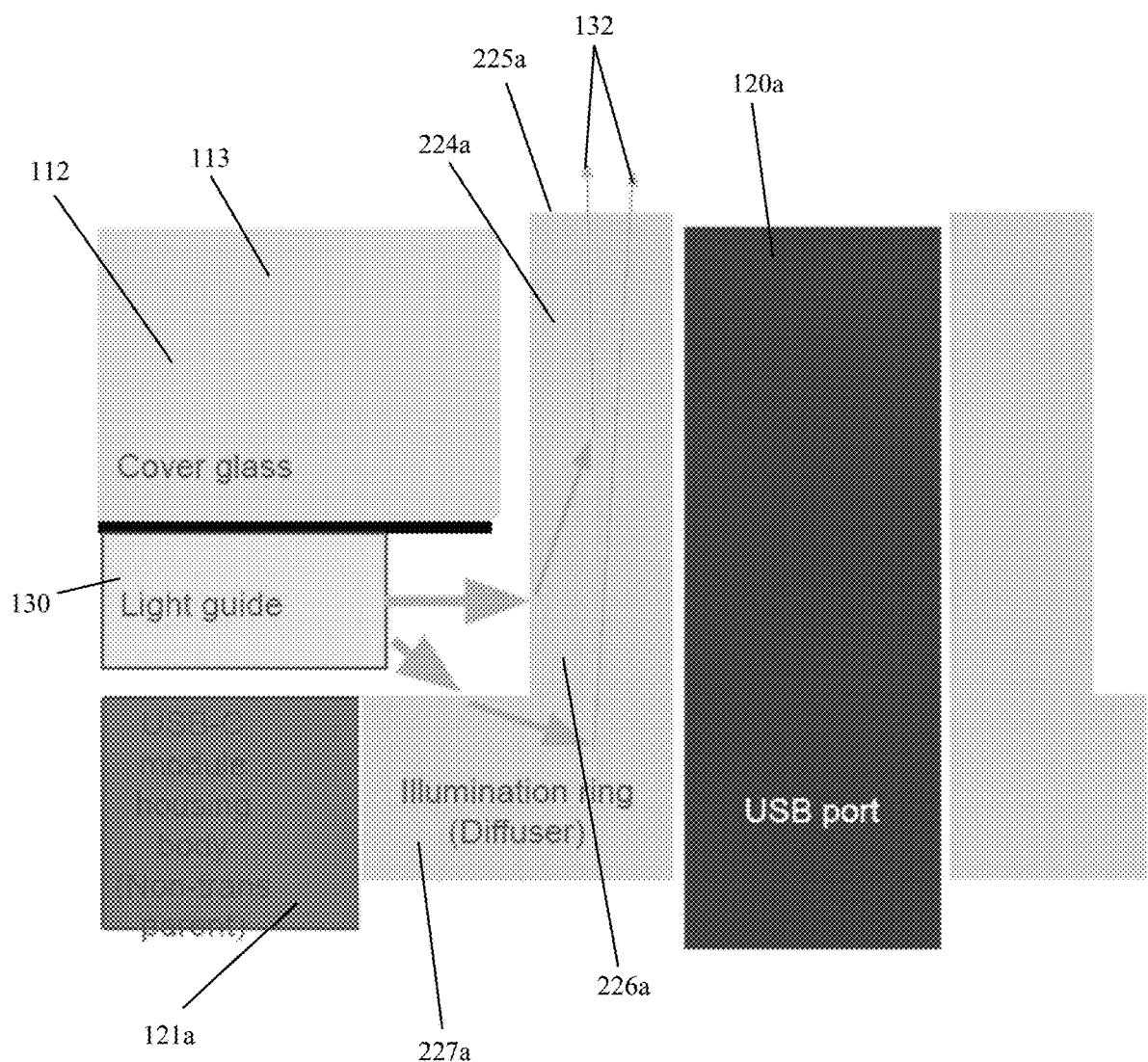
FIG. 5 is a simplified block diagram illustrating a port and diffuser according to example embodiments.

FIG. 5 illustrates an alternative diffuser 224*a*. As with the previous embodiment, the diffuser 224*a* includes a first portion 225*a* visible through the aperture 118*a* in the front panel 112. The first portion 225*a* includes an annular sidewall. The diffuser 224*a* further includes a second portion 226*a* distal the first portion 225*a* and located within the housing 110. The second portion 226*a* includes part of the annular sidewall and a flange 227*a* extending radially outward therefrom. The flange 227*a* is positioned proximate the light source 130 such that at least a portion of the light 132 transmitted by the light source 130 enters the flange 227*a*. The flange 227*a* increases the amount of surface area illuminated by the light source 130, further increasing the brightness and uniformity of the light 132 as it exits the first portion 225*a* of the diffuser 224*a*.

In operation, some of the light 132 may exit the diffuser 224*a* to the side instead of out the end of the first portion 225*a*. Light 132 exiting the side of the diffuser 224*a* may illuminate the cover glass 113 of the front panel 112 or the edges of the display 114. To prevent this, some embodiments include an opaque coating 240 covering at least a portion of an exterior surface 228*a* of the diffuser 224*a*.

Figure 6:
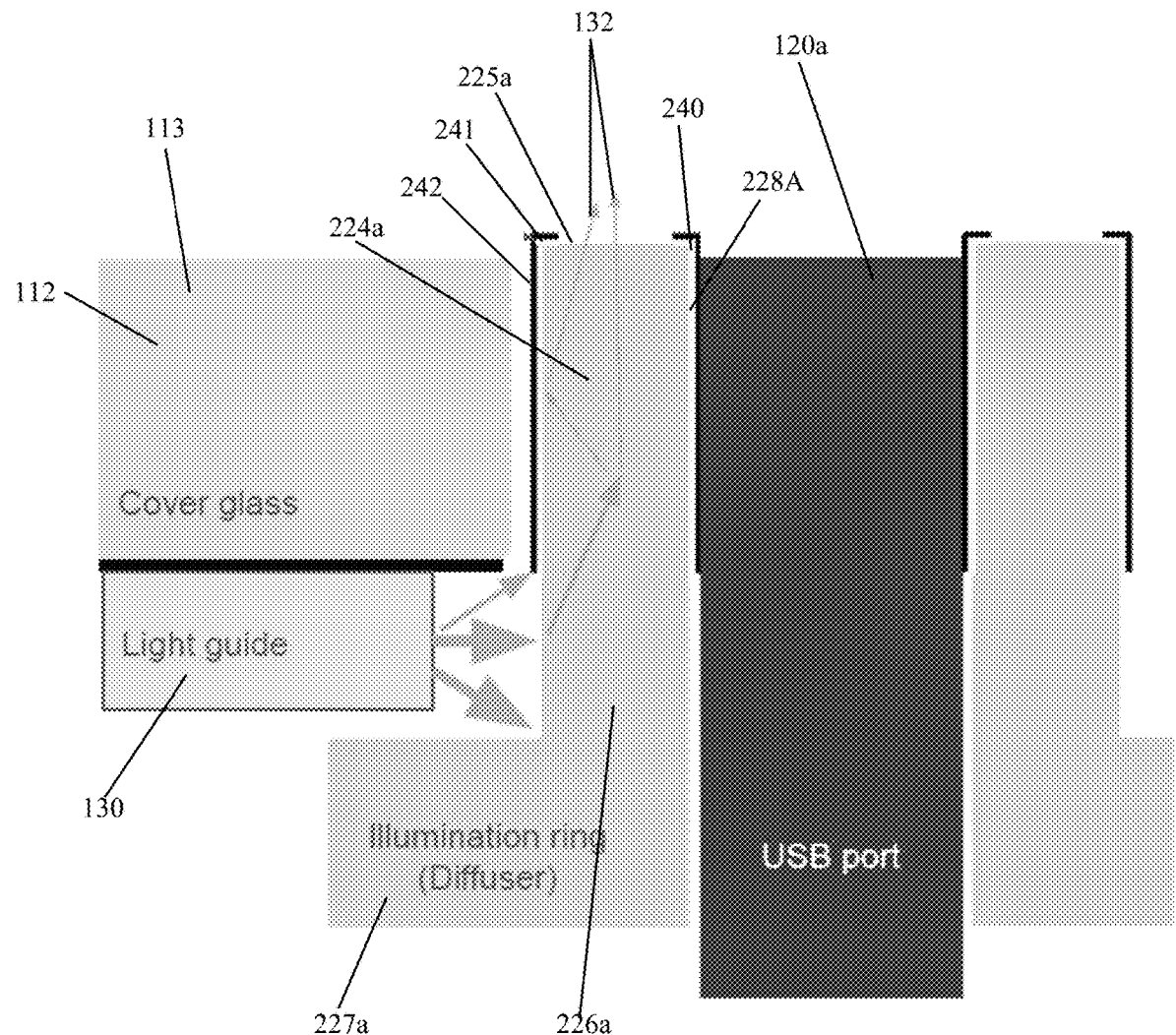
FIG. 6 is a simplified block diagram illustrating a port and diffuser according to example embodiments.

As shown in FIG. 6, the opaque coating 240 covers a portion of the surface 228*a* proximate the cover glass 113. The portions of the surface 228*a* proximate the light source 130 remain uncoated so as to allow the light 132 to enter the diffuser 224*a*. Similarly, at least part of the end surface of the first portion 225*a* remains uncoated to enable the light 132 to exit the diffuser 224*a*. As such, the opaque coating 240 defines a path along which the light 132 travels.

The opaque coating 240 includes a brightly colored, such as white or light gray, layer 241 applied to the diffuser 224*a*. As shown, light 132 that contacts the layer 241 is reflected back into the diffuser 224*a*, so as to continue traveling along the pathway defined by the opaque coating 140. In some forms, the opaque coating 240 is a multilayer coating having a second layer 242. The second layer 242 is a dark color, such as black or dark gray so as to absorb visible light. In a preferred embodiment, the opaque coating 140 at least partially coats a surface facing the display 114.

Figure 7:
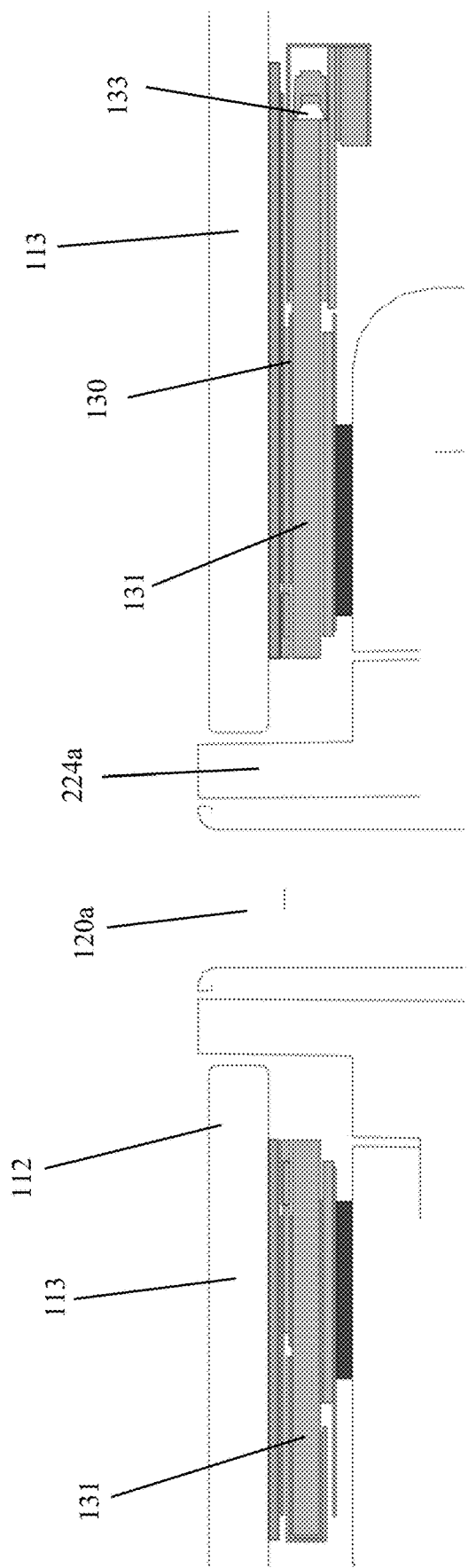
FIG. 7 is a simplified block diagram illustrating a port and diffuser according to example embodiments.

FIG. 7 illustrates the light source 130 which illuminates the diffuser 224*a*. The light source 130 includes a light guide 131 and an LED 133. Light from the LED 133 travels along the light guide 131 towards the diffuser 224*a*. The light from the light guide 131 illuminates the diffuser 224*a* as shown in FIGS. 5 and 6. One or more light guides 131 are positioned along the back of the cover glass 113 within the housing 112. As such, light from the LED 133 can be distributed by the light guides 131 to illuminate a plurality of indicia, such as the logo 116, light rings 124*a*/124*b*, and additional indicia 122*a*/122*b* shown in FIG. 2.

Figure 8:
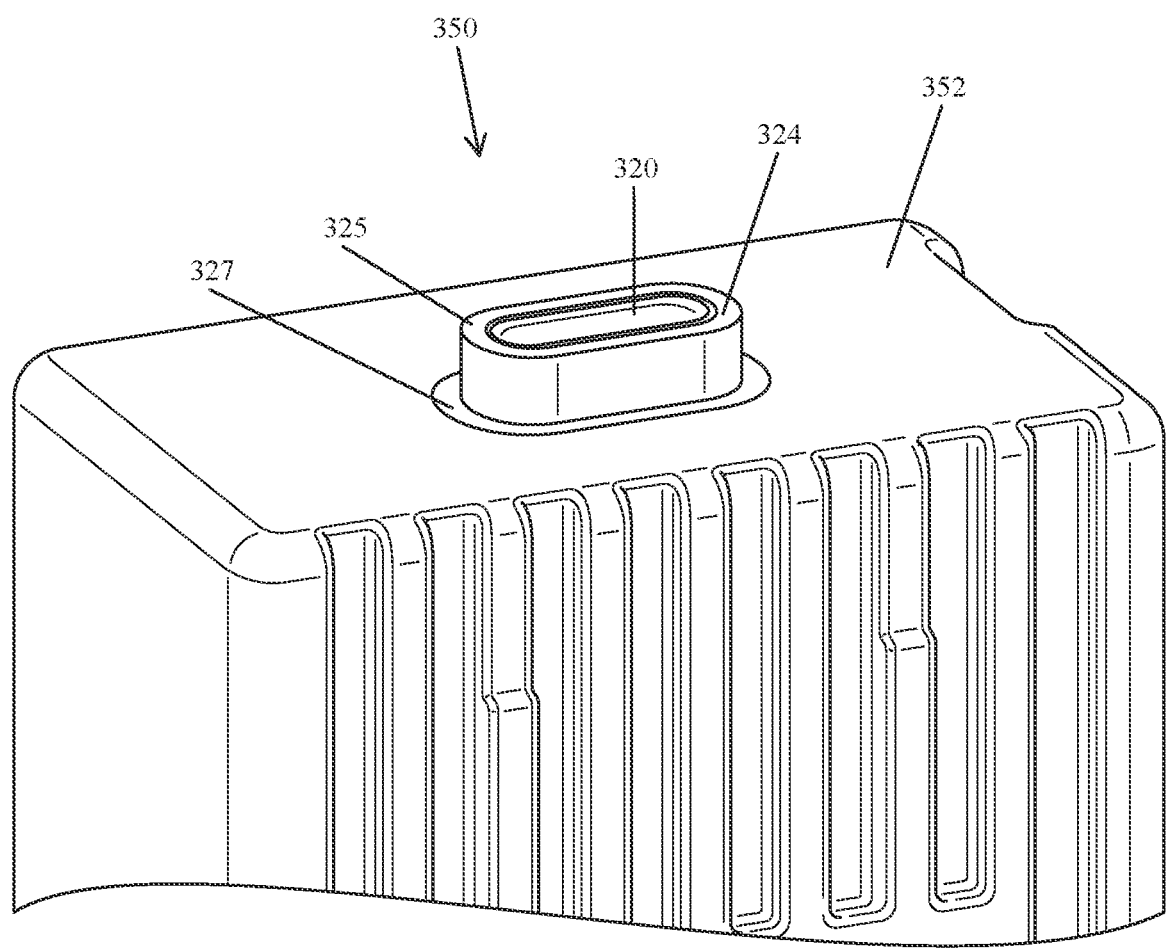
FIG. 8 illustrates an input/output module for use in the electronic console of FIG. 1.

FIG. 8 illustrates an input/output module 350 for use in the consoles described above. The shown input/output module 350 includes a housing 352. A port 320 extends outward from the housing 352. When installed in a console, the port 320 will extend into an aperture in the front panel as shown above. A diffuser 324 extends substantially the entire length of the port 320. The diffuser 324 has a first end 325 substantially flush with the end of the port 320. The diffuser also includes a flange 327 substantially flush with the housing 352. When installed, a light source is positioned between the housing 352 and the front panel so as to illuminate the diffuser 324. In one form, the flange 327 extends outward from the annular sidewall by 0.5 mm to 2 mm. In a preferred form, the flange 327 extends outward from the annular sidewall by about 1 mm to about 1.5 mm.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:
1. A console comprising:
 a housing comprising a front panel, wherein the front panel of the housing comprises a cover glass;
 a light source disposed within the housing;

a charging port positioned within an aperture of the front panel; and a diffuser comprising a first portion proximate the charging port and a second portion proximate the light source such that the diffuser diffuses light from the light source out the aperture of the front panel, wherein the first portion includes a proximal part of an annular sidewall, and wherein the second portion is distal the first portion within the housing and includes a distal part of the annular sidewall and a flange, wherein the flange extends radially outward from the distal part of the annular sidewall, and wherein the light source is positioned between the flange and the front panel of the housing.

2. The console of claim 1 wherein the light source includes a light guide disposed within the housing.

3. The console of claim 1 wherein the front panel of the housing includes a transparent surface and the light source includes a light guide disposed within the housing, wherein the light guide is configured to guide light from the light source to at least a portion of the transparent surface.

4. The console of claim 1 further including an opaque coating on at least one surface of the diffuser.

5. The console of claim 4 wherein the opaque coating is a multilayer coating.

6. The console of claim 5 wherein the opaque coating includes an inner layer having a bright color and an outer layer having a dark color.

7. The console of claim 1 further including a display screen.

8. The console of claim 7 further comprising an opaque coating on at least one surface of the diffuser, wherein the at least one surface faces the display screen.

9. The console of claim 1 wherein the charging port is a USB port.

10. The console of claim 9 wherein the USB port is a USB-C port.

11. The console of claim 1 wherein the light source is spaced apart from the diffuser.

12. A display console comprising:

a housing comprising a transparent surface, wherein the transparent surface of the housing comprises a cover glass;

a light source disposed within the housing, the light source including a light guide disposed within the housing, wherein the light guide is configured to guide light from the light source to at least a portion of the transparent surface;

a charging port; and a diffuser comprising a first portion proximate the charging port and a second portion proximate the light source such that the light source is spaced radially outward from the diffuser so as to illuminate at least a portion of the diffuser, wherein the first portion includes a proximal part of an annular sidewall, and wherein the second portion is distal the first portion within the housing and includes a distal part of the annular sidewall and a flange, wherein the flange extends radially outward from the distal part of the annular sidewall, and wherein the light source is positioned between the flange and the transparent surface of the housing.

13. The display console of claim 12 wherein the flange extends radially outward from the distal part of the annular sidewall by a distance of 0.5 mm to 2 mm.

14. The display console of claim 12 wherein the flange extends radially outward from the distal part of the annular sidewall by a distance of 1 mm to 1.5 mm.

15. The display console of claim 12 further including an opaque coating on at least one surface of the diffuser.

16. The display console of claim 15 wherein the opaque coating includes an inner layer having a bright color and an outer layer having a dark color.

* * * * *